(12) United States Patent
Hung

(10) Patent No.: US 7,817,234 B2
(45) Date of Patent: Oct. 19, 2010

(54) ALIGNMENT PATTERNS OF A MULTI-DOMAIN VERTICAL ALIGNMENT (MVA) LIQUID CRYSTAL DISPLAY PANEL HAVING A PLURALITY OF SHRINKING AREAS

(75) Inventor: Meng-Feng Hung, Changhua County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 488 days.

(21) Appl. No.: 11/161,361

(22) Filed: Aug. 1, 2005

(65) Prior Publication Data

US 2007/0002241 A1 Jan. 4, 2007

(30) Foreign Application Priority Data

Jun. 30, 2005 (TW) ............................... 94122085 A

(51) Int. Cl.
*G02F 1/1337* (2006.01)
*G02F 1/1343* (2006.01)
(52) U.S. Cl. ...................................... 349/139; 349/128
(58) Field of Classification Search ................. 349/139, 349/128
See application file for complete search history.

(56) References Cited

U.S. PATENT DOCUMENTS

| 6,927,828 | B2* | 8/2005 | Shih et al. ................... 349/143 |
| 2003/0231274 | A1* | 12/2003 | Wu ............................. 349/143 |
| 2005/0001962 | A1* | 1/2005 | Maeda ........................ 349/114 |
| 2005/0024567 | A1 | 2/2005 | Sawasaki et al. |
| 2005/0122459 | A1 | 6/2005 | Song et al. |
| 2005/0140914 | A1* | 6/2005 | Sawasaki et al. ............ 349/155 |

FOREIGN PATENT DOCUMENTS

| EP | 0987582 | | 3/2000 |
| EP | 1411385 | | 4/2004 |
| EP | 1 429 177 | * | 6/2004 |
| EP | 1429177 | | 6/2004 |
| EP | 1659444 | | 5/2006 |
| JP | 2000155317 | | 6/2000 |
| JP | 200183522 | | 3/2001 |
| JP | 2002107730 | | 4/2002 |
| JP | 2002303869 | | 10/2002 |
| JP | 200343488 | | 2/2003 |
| JP | 200384266 | | 3/2003 |
| JP | 200438166 | | 2/2004 |
| JP | 2004301879 | | 10/2004 |
| JP | 2004302291 | | 10/2004 |
| JP | 2004318077 | | 11/2004 |
| TW | 583425 | | 4/2004 |

* cited by examiner

*Primary Examiner*—David Nelms
*Assistant Examiner*—Lauren Nguyen
(74) *Attorney, Agent, or Firm*—Jianq Chyun IP Office

(57) ABSTRACT

A liquid crystal display panel comprising a first substrate, a second substrate and a liquid crystal layer is provided. The first substrate has an active device array, a pixel electrode layer and a plurality of first alignment patterns. Each first alignment pattern has at least a first shrinking area. The width of the first shrinking area is smaller than that of the other area of the first alignment pattern. The second substrate is disposed above the first substrate and has an electrode layer and a plurality of second alignment patterns. The second alignment patterns and the first alignment patterns are staggered. The liquid crystal layer is disposed between the first substrate and the second substrate. The present invention can provide better dynamic pictures.

6 Claims, 12 Drawing Sheets

ALIGNMENT PATTERNS OF A MULTI-DOMAIN VERTICAL ALIGNMENT (MVA) LIQUID CRYSTAL DISPLAY PANEL HAVING A PLURALITY OF SHRINKING AREAS

CROSS-REFERENCE TO RELATED APPLICATION

This application claims the priority benefit of Taiwan application serial no. 94122085, filed on Jun. 30, 2005. All disclosure of the Taiwan application is incorporated herein by reference.

BACKGROUND OF THE INVENTION

1. Field of the Invention

The present invention generally relates to a liquid crystal display panel, and more particularly, to a multi-domain vertical alignment (MVA) liquid crystal display panel.

2. Description of Related Art

With such advantages as high image quality, high space utility rate, low power consumption and free radiation, the thin film transistor liquid crystal display (TFT LCD) has become a major product in the display market. Current requirements for performance of the LCD are directed to high contrast ratio, fast response and wide-view angle. For example, a multi-domain vertical alignment (MVA) LCD can achieve the requirement for wide-view angle, which is described as follows.

FIG. 1 shows a top view of a conventional multi-domain vertical alignment LCD, wherein only one pixel is illustrated. FIG. 1A shows a cross-sectional view along line A-A' in FIG. 1. Referring to FIG. 1 and FIG. 1A, a MVA LCD panel 100 at least comprises an active-device-array substrate 110, a color filter substrate 120 and a liquid crystal layer 130, wherein the active-device-array substrate 110 at least comprises a substrate 111, a scan line 112, a signal line 113, a common electrode 114, a thin film transistor 115 and a pixel electrode layer 116. More, slits are formed in the pixel electrode 116.

In addition, the scan line 112 and the signal line 113 define a pixel area 110a on the substrate 111, wherein the thin film transistor 115 is disposed inside the pixel area 110a and electrically connected to corresponding signal line 113 and scan line 112. The pixel electrode layer 116 is correspondingly disposed inside the pixel area 110a and electrically connected to the corresponding thin film transistor 115. The common electrode 114 and the pixel electrode layer 116 serve as two electrodes of a storage capacitor.

Referring to FIG. 1 and FIG. 1A, the color filter substrate 120 is disposed over the active-device-array substrate 110 and at least comprises a substrate 121, a color photo-resist layer 122, an electrode layer 123 and a protrusion 124. In addition, the color photo-resist layer 122 is disposed on the substrate 121, the electrode layer 123 is disposed on the color photo-resist layer 122 and the protrusion 124 is disposed on the electrode layer 123. Besides, the liquid crystal layer 130 is disposed between the active-device-array substrate 110 and the color filter substrate 120, wherein the liquid crystal layer 130 comprises a plurality of liquid molecules.

When a driven voltage is applied between these two substrates 110 and 120, electrical lines near the slit 118 in the active-device-array substrate 110 and the protrusion 124 disposed on the color filter substrate 120 are distorted and thus alter the alignment of liquid molecules near the slit 118 and the protrusion 124. Therefore, a LCD with a wide-view angle is fabricated by means of the different liquid crystal alignment. However, aforementioned design of pixel structure has several problems when displaying moving pictures, which are described as follows.

FIGS. 2A and 2B are schematic diagrams of checking the display quality of a conventional MVA LCD panel by using moving checking frames. FIG. 3 is a top view of a liquid crystal molecule alignment state. Referring to FIGS. 2A, 2B and 3, first, a black block 210 is displayed on a white frame 220 as shown in FIG. 2A. Next, the black block 210 moves on the white frame 220 as shown in FIG. 2B. In addition, the electrical lines distorted near the slit 118 and the protrusion 124 (shown in FIG. 3) cause the liquid crystal molecule 132 nearby to have different tilt direction from that of liquid crystal molecule 132 in other areas. Consequently, when electric field changes or the picture changes (that is, the black block 210 shown in FIG. 2B moves), the liquid crystal molecule nearby is not able to be polarized to a stable state, thereby generating a dynamic crosstalk, which results in an image-dragged white area 230 shown in FIG. 2B.

SUMMARY OF THE INVENTION

Accordingly, the present invention is directed to a LCD panel with better dynamic display images.

The present invention is further directed to a pixel structure, disposed on an active-device-array substrate. Through the design of the pixel structure, the LCD panel with the active-device-array substrate can have better dynamic display images.

The present invention is further directed to a pixel structure, disposed on a color filter substrate. Through the design of the pixel structure, the LCD panel with the color filter substrate can have better dynamic display images.

Based on the above objectives and other objectives, a LCD panel comprising a first substrate, a second substrate and a liquid crystal layer is provided. The first substrate has an active device array, a pixel electrode layer and a plurality of first alignment patterns, wherein each first alignment pattern has at least a first shrinking area. The width of the first shrinking area is smaller than that of the other area in the first alignment pattern. The second substrate is disposed above the first substrate and has an electrode layer and a plurality of second alignment patterns thereon. The second alignment patterns and the first alignment patterns are staggered. The liquid crystal layer is disposed between the first substrate and the second substrate.

In one embodiment of the present invention, each of the second alignment patterns at least comprises a second shrinking area, wherein the width of the second shrinking area is smaller than that of the other area in the second alignment pattern.

In one embodiment of the present invention, the first alignment patterns are comprised of a plurality of protrusions disposed on the pixel electrode layer.

In one embodiment of the present invention, the first alignment patterns are comprised of a plurality of slits formed in the pixel electrode layer, and the pixel electrode layer between two neighboring slits further comprises a plurality of openings, for example.

In one embodiment of the present invention, the second alignment patterns are comprised of a plurality of protrusions disposed on the electrode layer.

In one embodiment of the present invention, the second alignment patterns are comprised of slits formed in the pixel electrode layer, and the pixel electrode layer between two neighboring slits further comprises a plurality of openings, for example.

In one embodiment of the present invention, the active device array comprises, for example, a plurality of signal lines, a plurality of scan lines and a plurality of thin film transistors. The signal lines and the scan lines define a plurality of pixel areas, in which the thin film transistors are respectively disposed. More, the thin film transistors are respectively electrically connected to the plurality of signal lines and scan lines.

In one embodiment of the present invention, the second substrate, for example, comprises a color photo-resist layer.

The present invention further provides a pixel structure. The pixel structure comprises an active element, a pixel electrode layer and a plurality of alignment patterns. The active element is disposed on a substrate. In addition, the pixel electrode layer is disposed on the substrate and electrically connected to the active element. The alignment patterns are disposed on the pixel electrode layer, wherein each alignment pattern has at least a shrinking area. The width of the shrinking area is smaller than that of the other area in the alignment pattern.

In one embodiment of the present invention, the alignment pattern is comprised of a plurality of protrusions formed on the pixel electrode layer.

In one embodiment of the present invention, the alignment pattern is comprised of a plurality of slits formed in the pixel electrode layer, and the pixel electrode layer between two neighboring slits, for example, further comprises a plurality of openings.

The present invention further provides a pixel structure. The pixel structure comprises a color photo-resist layer, an electrode layer and a plurality of alignment patterns. The color photo-resist layer is disposed on a substrate. In addition, the electrode layer is disposed on the color photo-resist layer. The alignment patterns are disposed on the electrode layer, wherein each alignment pattern has at least a shrinking area. The width of the shrinking area is smaller than that of the other area in the alignment pattern.

In one embodiment of the present invention, the alignment pattern is comprised of a plurality of protrusions formed on the pixel electrode layer.

In one embodiment of the present invention, the alignment pattern is comprised of a plurality of slits formed in the pixel electrode layer, and the pixel electrode layer between two neighboring slits, for example, further comprises a plurality of openings.

As the present invention utilizes alignment patterns with shrinking areas, the liquid crystal molecule nearby can quickly be polarized to a stable state when electric field changes or picture changes.

The objectives, other features and advantages of the invention will become more apparent and easily understood from the following detailed description of the invention when taken in conjunction with the accompanying drawings.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention.

DESCRIPTION OF THE EMBODIMENTS

Figure 1:
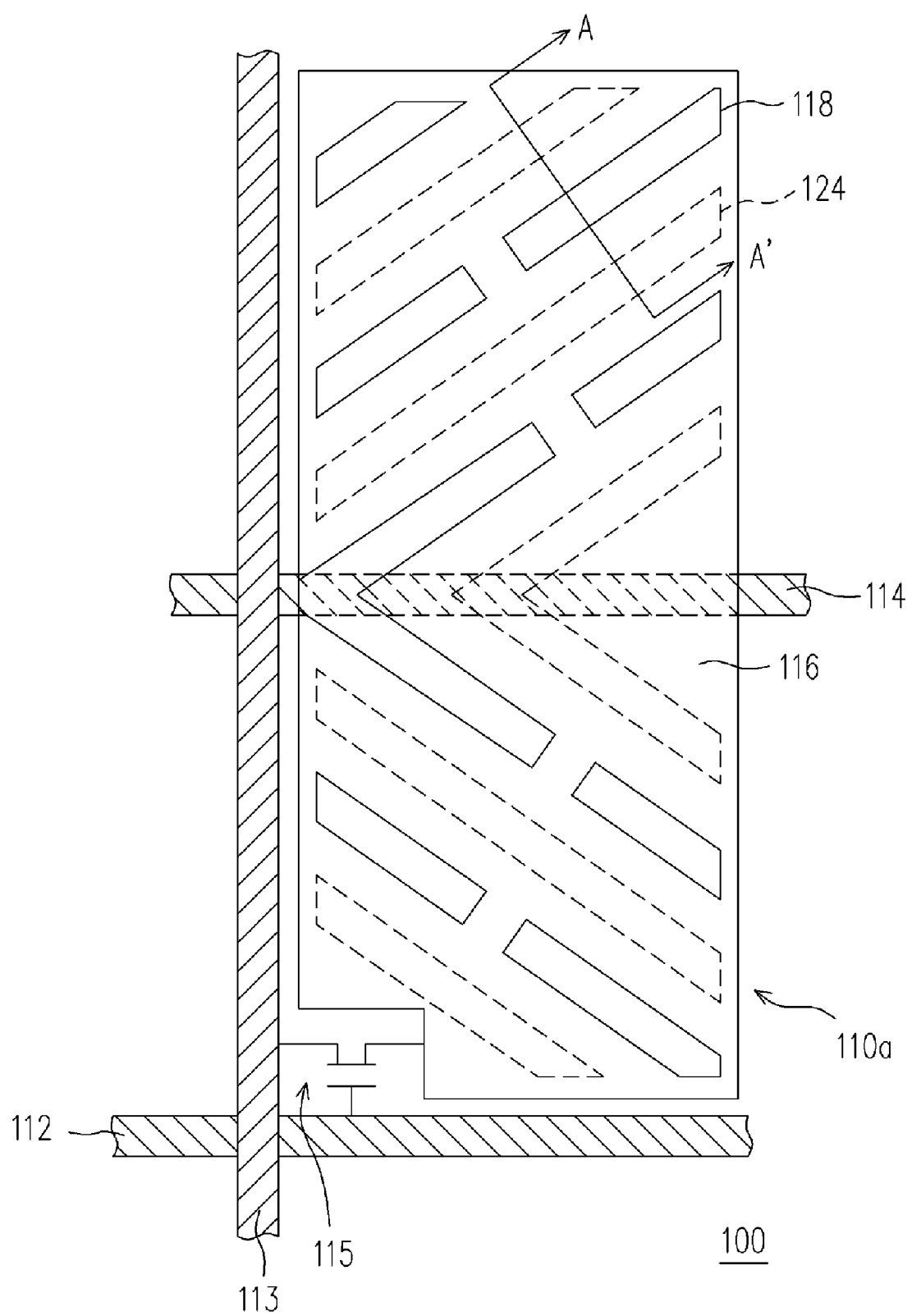
FIG. 1 shows a top view of a conventional multi-domain vertical alignment LCD.
Figure 1A:
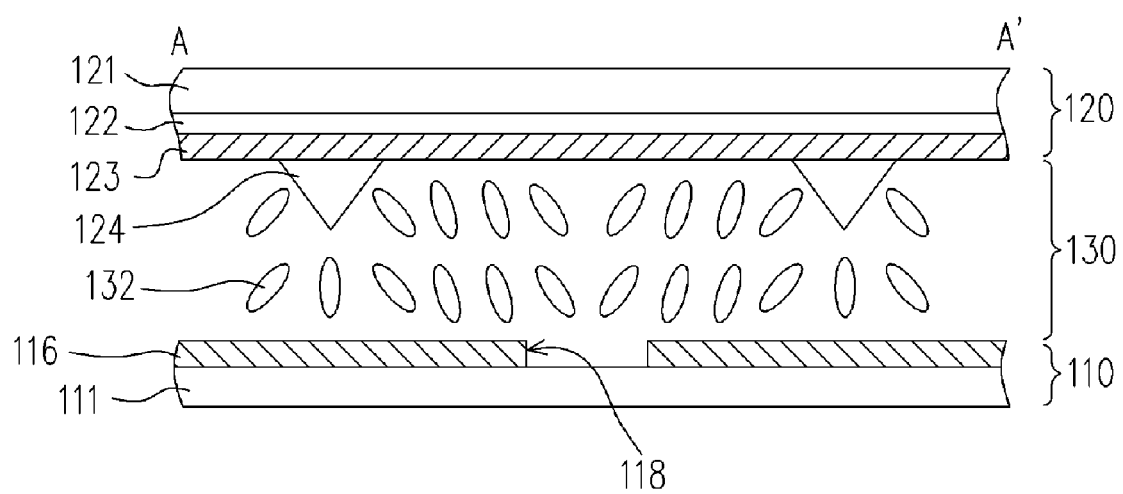
FIG. 1A shows a cross-sectional view along line A-A' in FIG. 1.
Figure 2A:
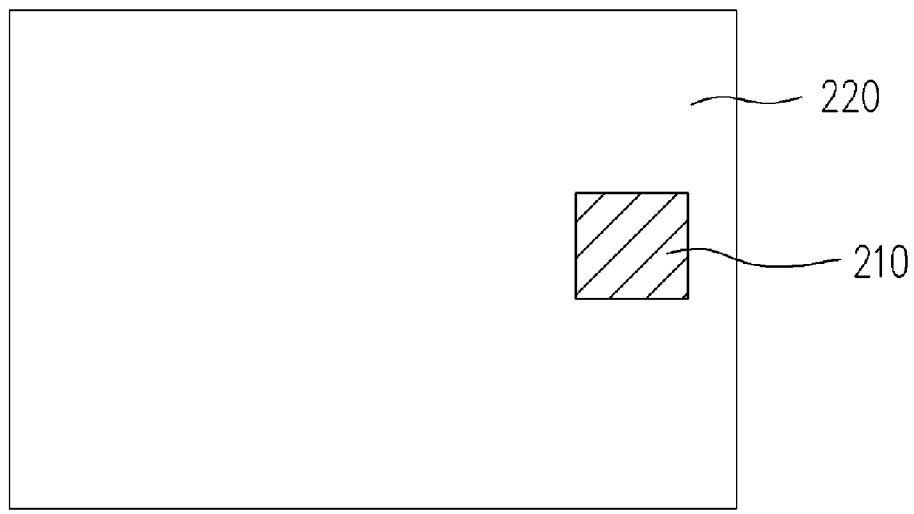
FIGS. 2A and 2B are schematic diagrams of checking the display quality of a conventional MVA LCD panel by using moving checking pictures.
Figure 2B:
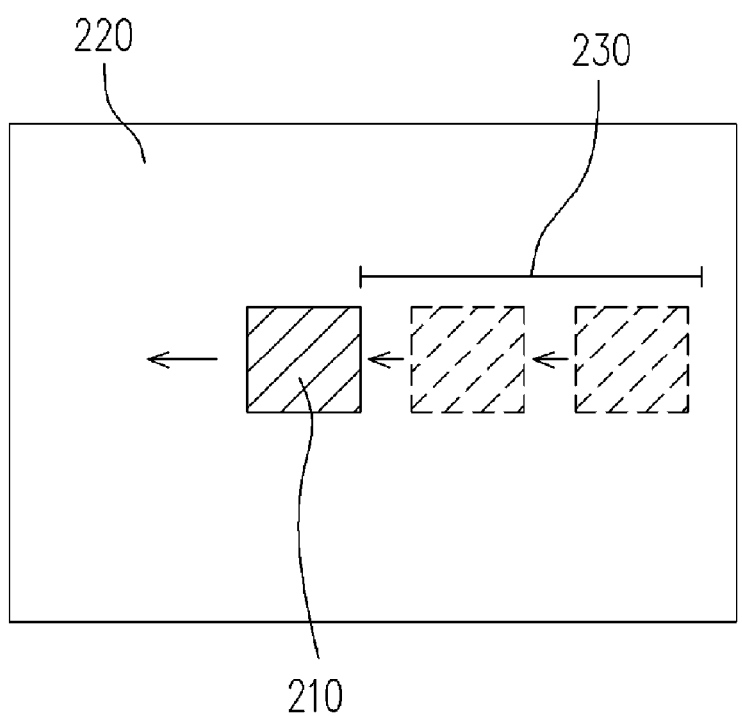
Figure 3:
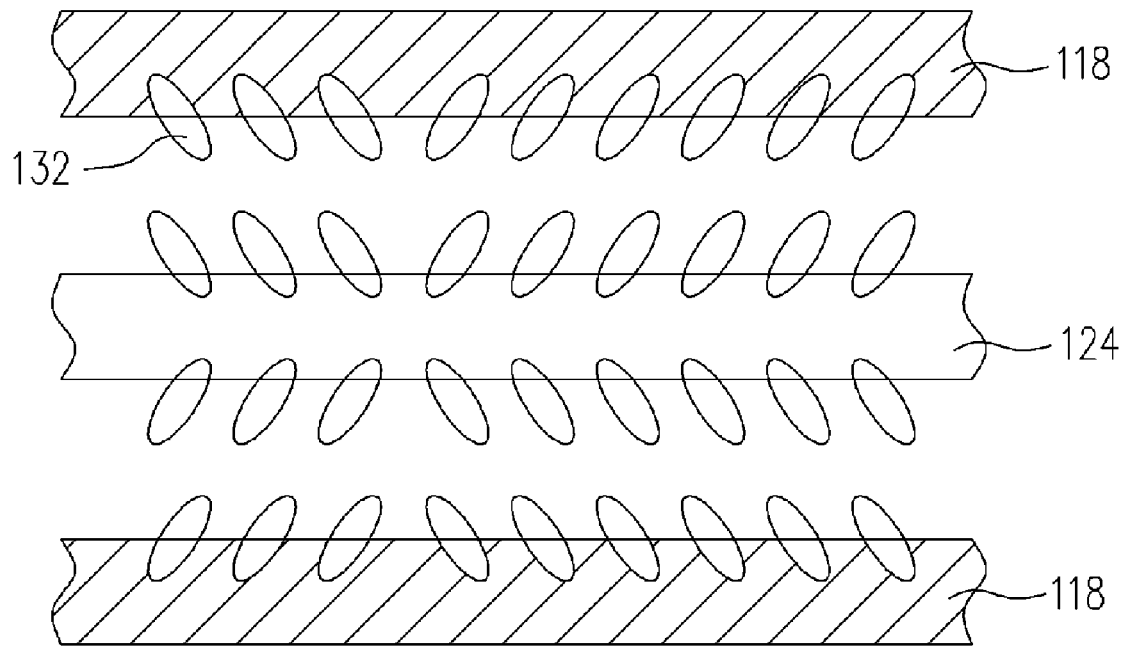
FIG. 3 is a top view showing a liquid crystal molecule alignment state.

Reference will now be made in detail to an MVA LCD of a present embodiment of the invention, examples of which are illustrated in the accompanying drawings. Wherever possible, the same reference numbers are used in the drawings and the descriptions to refer to the same parts.

Figure 4:
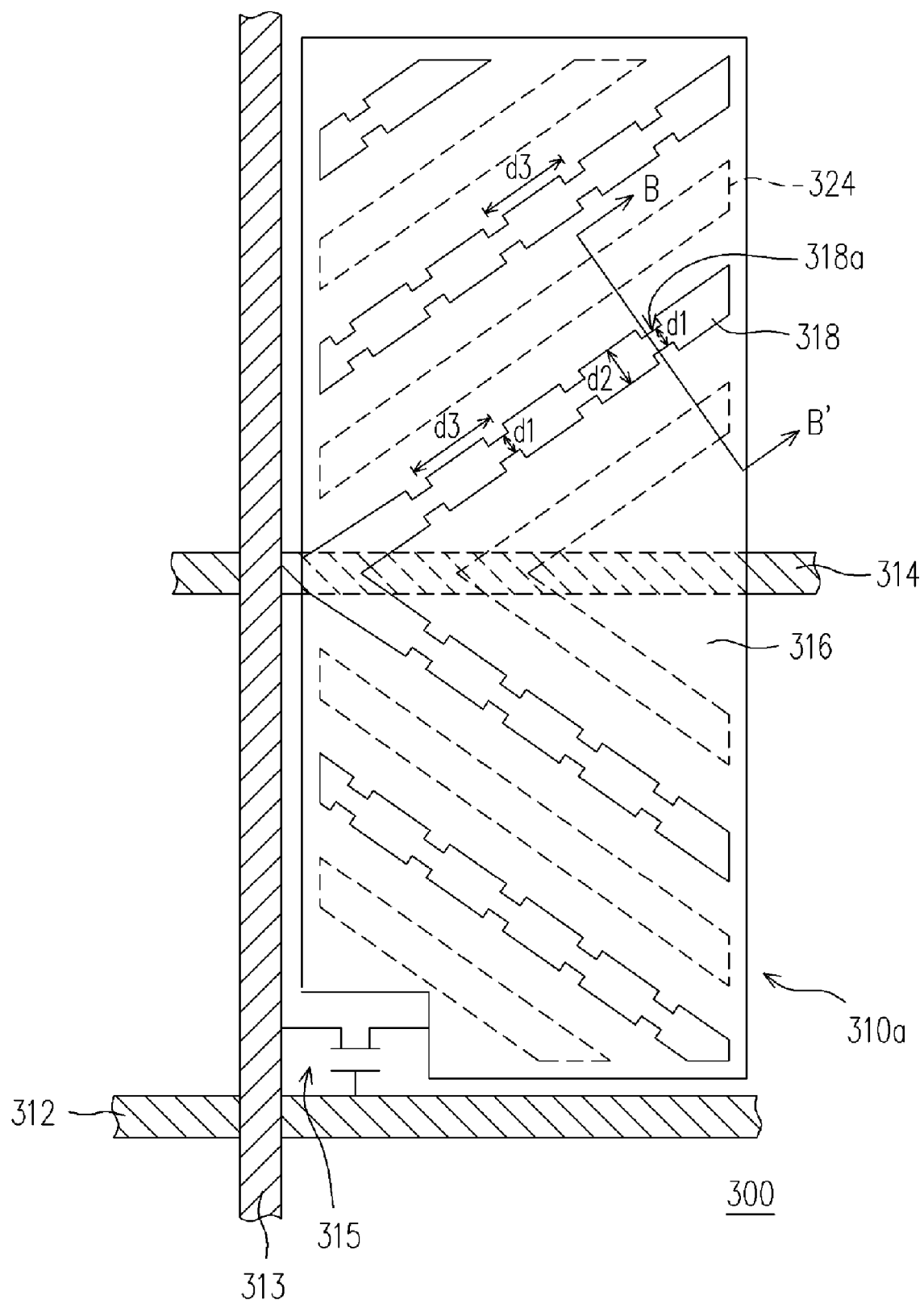
FIG. 4 schematically shows a top view of a MVA LCD panel according to an embodiment of the present invention.
Figure 4A:
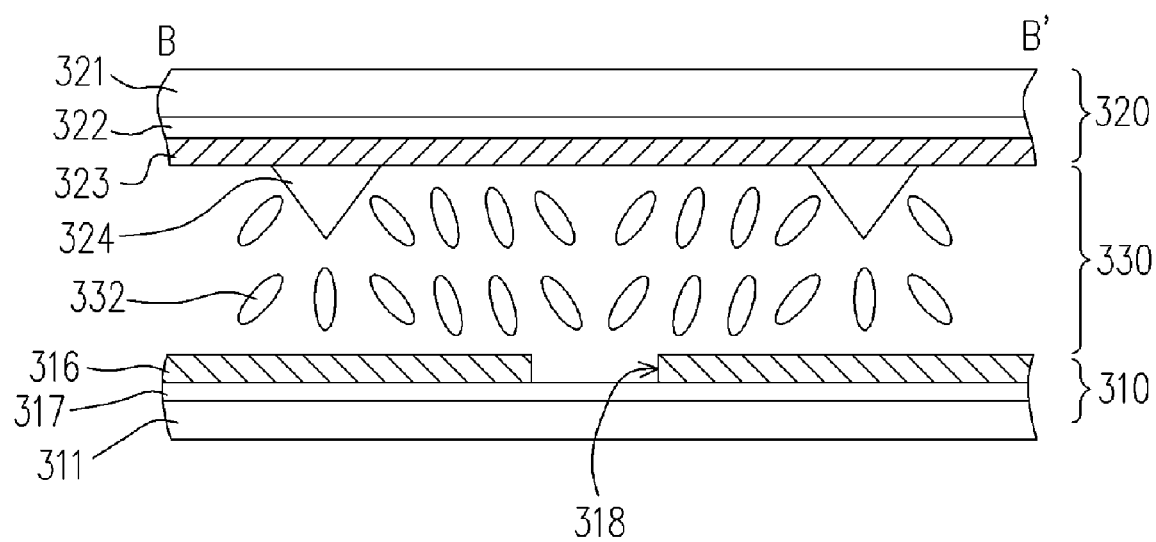
FIG. 4A shows a cross-sectional view along line B-B' in FIG. 4.

FIG. 4 schematically shows a top view of a MVA LCD panel according to an embodiment of the present invention. FIG. 4A shows a cross-sectional view along line B-B' in FIG. 4. Referring to FIGS. 4 and 4A, the MVA LCD panel 300, for example, comprises a first substrate 310, a second substrate 320 and a liquid crystal layer 330. The first substrate 310 comprises an active device array 317, a pixel electrode layer 316 and a plurality of first alignment patterns 318, wherein each first alignment pattern has at least a shrinking area 318a. The width d1 of the shrinking area 318a is smaller than that d2 of the other area in the first alignment pattern. The second substrate 320 is disposed over the first substrate 310 and comprises an electrode layer 323 and a plurality of second alignment patterns 324. The second alignment patterns 324 and the first alignment patterns 318 are staggered. The liquid crystal layer 330 is disposed between the first substrate 310 and the second substrate 320. In addition, the liquid crystal layer 330 comprises a plurality of liquid crystal molecules 332.

Referring to FIGS. 4 and 4A, in one embodiment of the present invention, the first substrate 310, for example, is an active-device-array substrate comprising an active device array 317. The active device array 317, for example, comprises a plurality of signal lines 313 (only one is shown in FIG. 4), a plurality of scan lines 312 (only one is shown in FIG. 4) and a plurality of thin film transistors 315 (only one is shown in FIG. 4). The signal lines 313 and the scan lines 315 define a plurality of pixel areas 310a (only one is shown in FIG. 4), in which the thin film transistors 315 are respectively disposed. More, the thin film transistors 315 are respectively electrically connected to the plurality of signal lines 313 and scan lines 312. Besides, the thin film transistor 315 is electrically connected to the corresponding pixel electrode layer 316. In addition, the first substrate 310 comprises a common electrode 314 disposed thereon, wherein the common electrode 314 and the electrode layer 316 are used as two electrodes of a storage capacitor. In addition, in one embodiment, the second substrate 320, for example, comprises a color photo-resist layer 322 disposed thereon, which allows light to pass through to make the LCD panel full color.

Note that the first alignment patterns 318, for example, are comprised of a plurality of slits formed in the electrode layer 316, wherein the slits are formed when patterning the electrode layer 316. Especially, the slit 318 has a first shrinking area 318a, whose width d1 is smaller than that d2 of the slit 318. More, as shown in FIG. 4, a plurality of first shrinking areas 318a are separated by a fixed distance d3 and disposed on each slit 318. Further, the second alignment pattern 324 disposed on the second substrate 320, for example, is comprised of a plurality of protrusions formed on an electrode layer 323. The second alignment patterns 324 and the first alignment patterns 318 are staggered.

Figure 5:
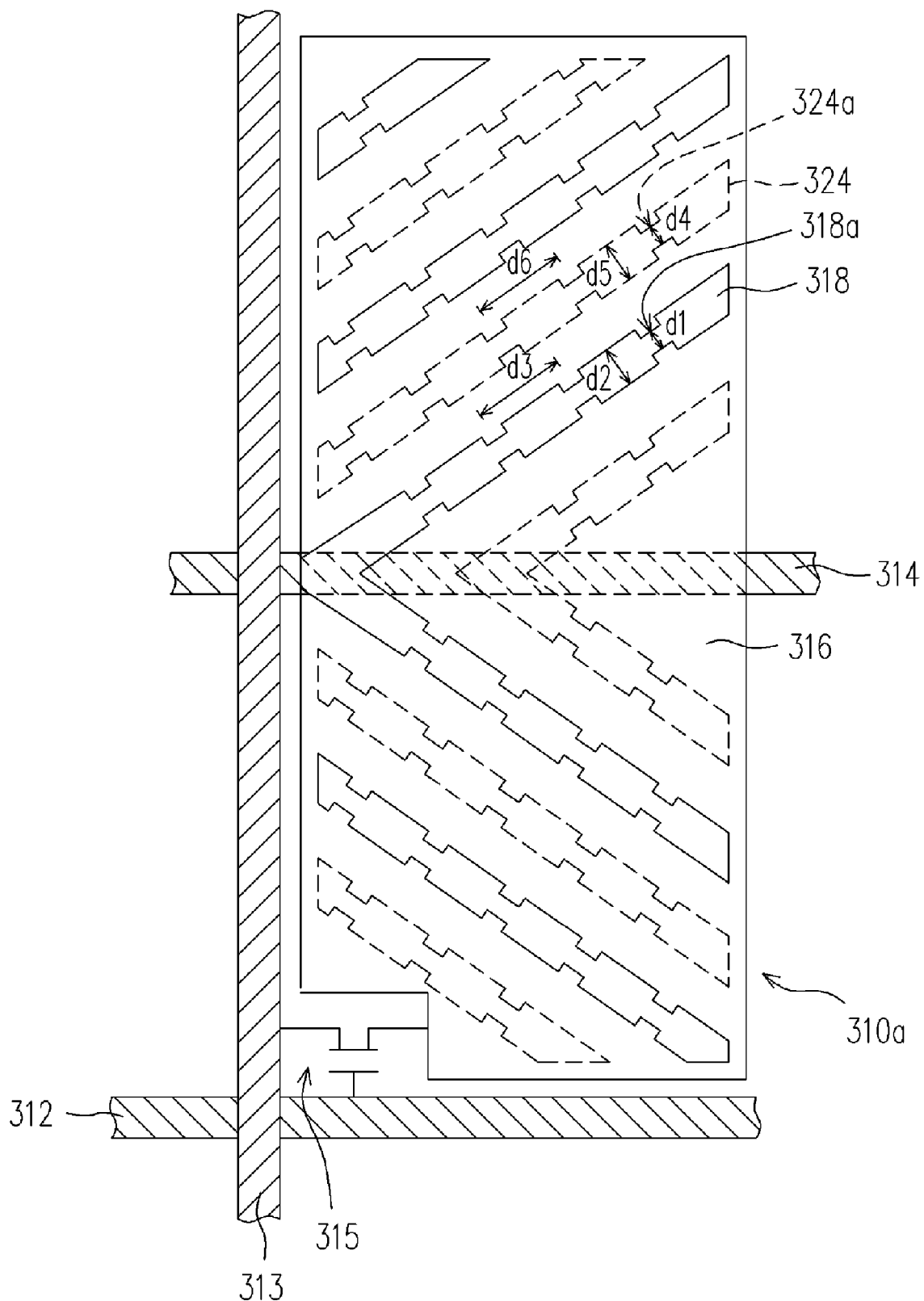
FIG. 5 schematically shows a top view of another MVA LCD panel according to an embodiment of the present invention.

FIG. 5 schematically shows a top view of another MVA LCD panel according to an embodiment of the present invention. The same reference numbers shown in FIG. 4 and FIG. 5 refer to the same parts. Note that the second alignment pattern 324 disposed on the second substrate 320, for example, at least has a second shrinking area 324a, whose width d4 is smaller than that d5 of other areas of the second alignment pattern 324. In one embodiment, the second shrinking areas 324a are separated by a fixed distance d6 and disposed on the second alignment pattern 324. The second alignment patterns 324 disposed on the second substrate 320 and the first alignment patterns 318 disposed on the first substrate 310, are staggered. More, the second alignment pattern 324, for example, is a protrusion and the first alignment pattern 318, for example, is a slit. Further, the first alignment patterns 318 disposed on the first substrate 310 may comprise a slit with a shrinking area 318a or a protrusion. Also, the second alignment patterns 324 disposed on the second substrate 320 may comprise a slit with a shrinking area 324a or a protrusion. A variety of MVA LCD panels are fabricated with different matches between the first substrate 310 and the second substrate 320.

Figure 6A:
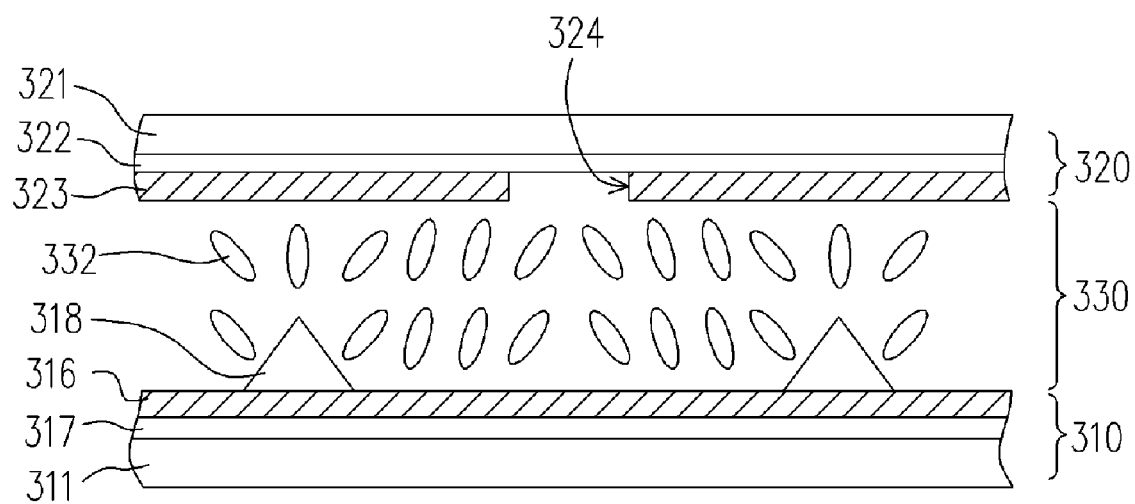
FIGS. 6A-6C are cross-sectional views of three kinds of MVA LCD panels according to an embodiment of the present invention.
Figure 6B:
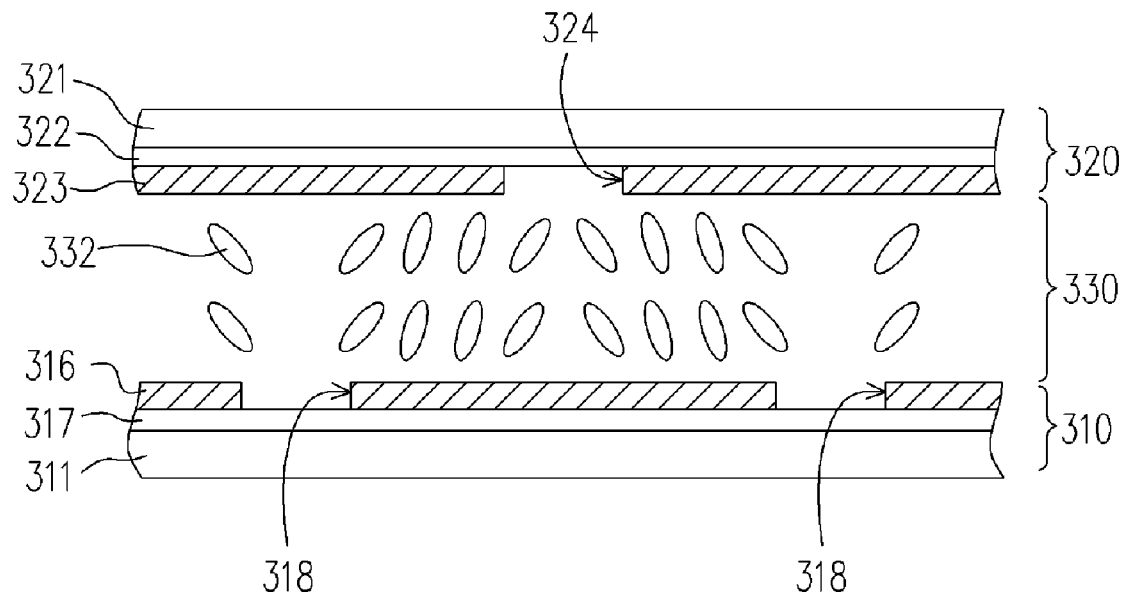
Figure 6C:
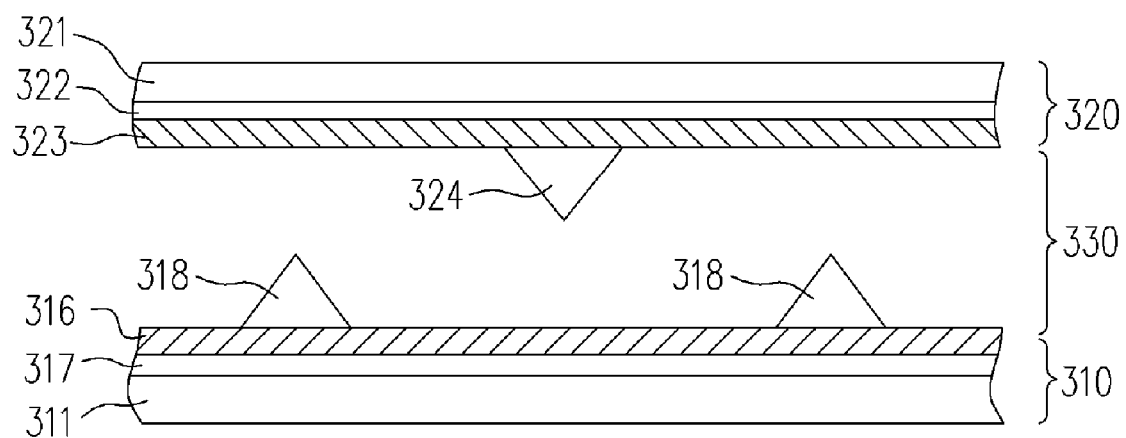

In addition to the MVA LCD panels shown in FIG. 4, FIG. 6A-6C show cross-sectional views of three kinds of MVA LCD panels according to an embodiment of the present invention. Referring to FIG. 6A, the first alignment patterns 318 disposed on the first substrate 310 may comprise a plurality of protrusions formed in the electrode layer 316. Also, the second alignment patterns 324 disposed on the second substrate 320 may comprise a plurality of slits formed in the electrode layer 323. Likewise, as shown in FIG. 5, each second alignment pattern 324 has at least a second shrinking area 324a, whose width d4 is smaller than that d5 of the other area of the second alignment pattern 324. Referring to FIGS. 5 and 6B, the first alignment patterns 318 and the second alignment patterns 324 can be designed to have slits with a first shrinking area 318a and a second shrinking area 324a. More, Referring to FIGS. 5 and 6C, the first alignment patterns 318 and the second alignment patterns 324 can be designed to have protrusions with a first shrinking area 318a and a second shrinking area 324a. When a driving voltage is applied between these two substrates 310 and 320, electrical line distribution near the first shrinking area 318a and the second shrinking area 324a can make the liquid crystal molecules 332 to be tilted in the same direction and are thus quickly polarized to s stable state.

In summary, the first alignment patterns 318 disposed on the first substrate 310 may comprise slits or protrusions with shrinking area 318a. Also, the second alignment patterns 324 disposed on the second substrate 320 may comprise slits or protrusions with shrinking area 324a. When a driving voltage is applied between these two substrates 310 and 320 that utilize different matches of slits and protrusions having shrinking areas 318a, 324a, electrical line distribution near the first shrinking area 318a and the second shrinking area 324a can make the liquid crystal molecules 332 to be tilted in the same direction and are thus quickly polarized to s stable state. Therefore, the present invention is able to enhance the display performance of dynamic pictures.

Figure 7:
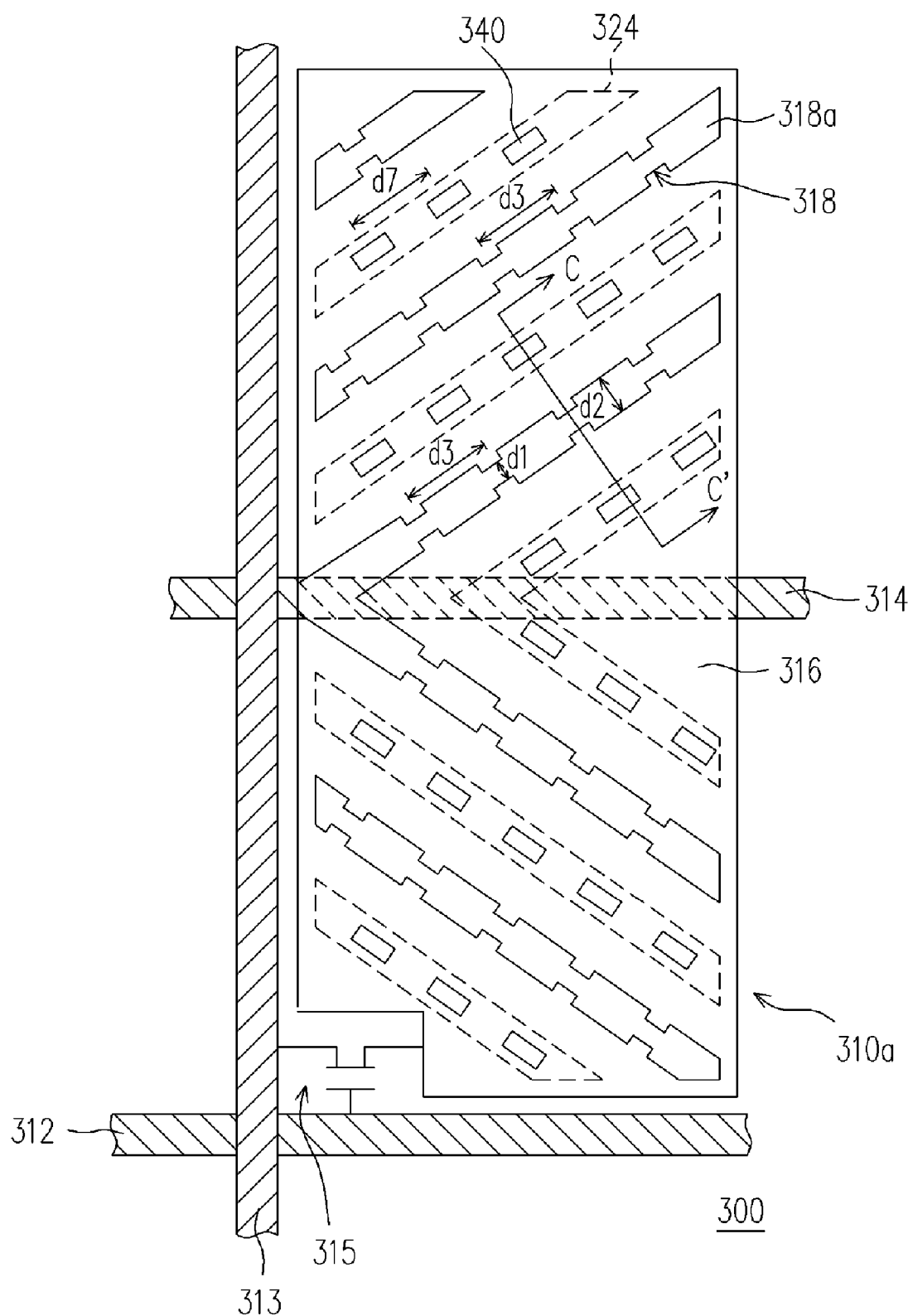
FIG. 7 schematically shows a top view of still another MVA LCD panel according to the third embodiment of the present invention.
Figure 7A:
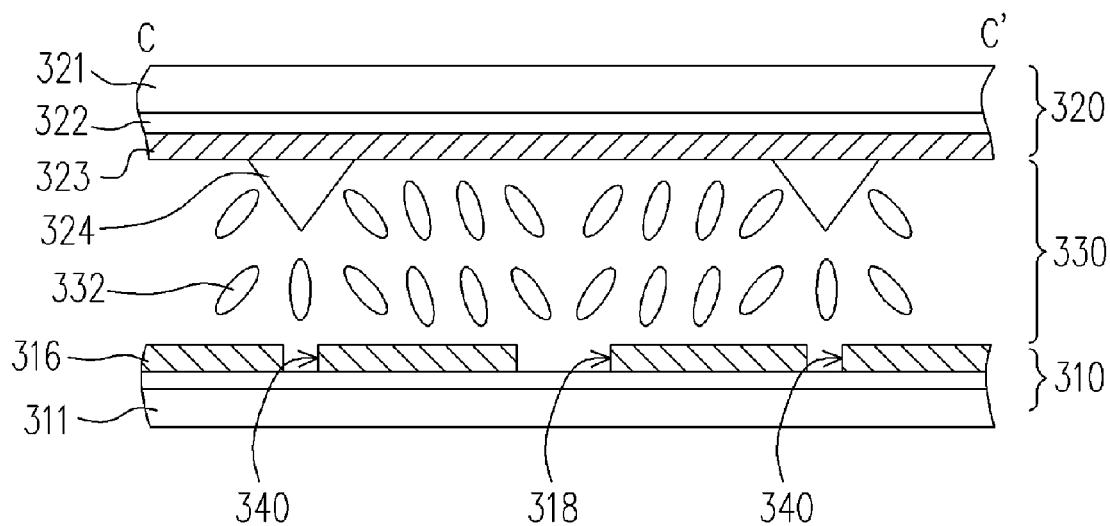
FIG. 7A shows a cross-sectional view along line C-C' in FIG. 7.

FIG. 7 schematically shows a top view of yet another MVA LCD panel according to an embodiment of the present invention. FIG. 7A shows a cross-sectional view along line C-C' in FIG. 7. The same reference numbers shown in FIGS. 7, 7A and shown in FIGS. 4, 4A refer to the same parts, whose description is not repeated here.

Note that when the first alignment pattern 318 comprises slits, the electrode pixel layer between two neighboring slits further comprise, for example, a plurality of openings 340. As shown in FIGS. 7, 7A, these openings 340 are separated by a fixed distance d7 and formed in the pixel electrode layer 316 on the opposite side of the second alignment pattern 324 (protrusions).

Figure 8A:
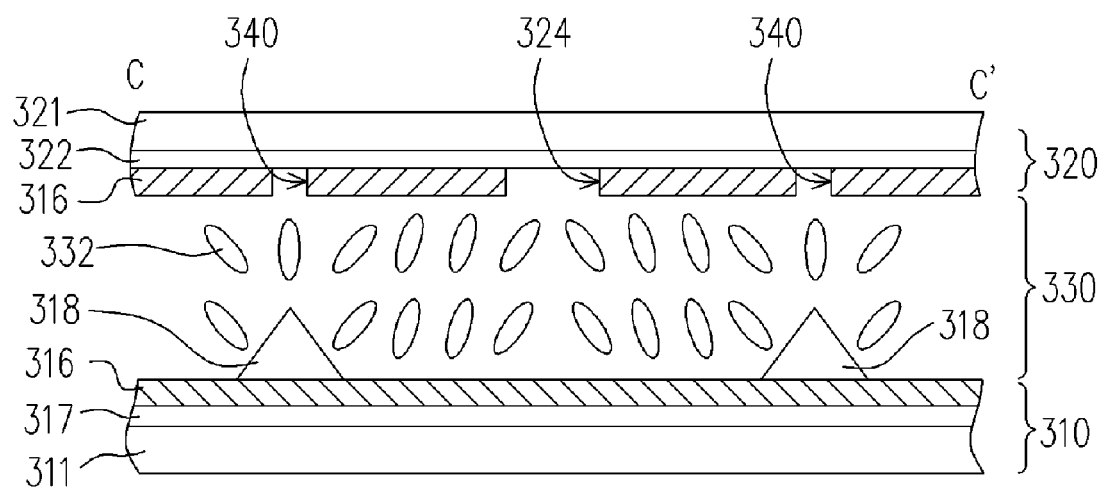
FIGS. 8A-8C are cross-sectional views of three kinds of MVA LCD panels according to an embodiment of the present invention.
Figure 8B:
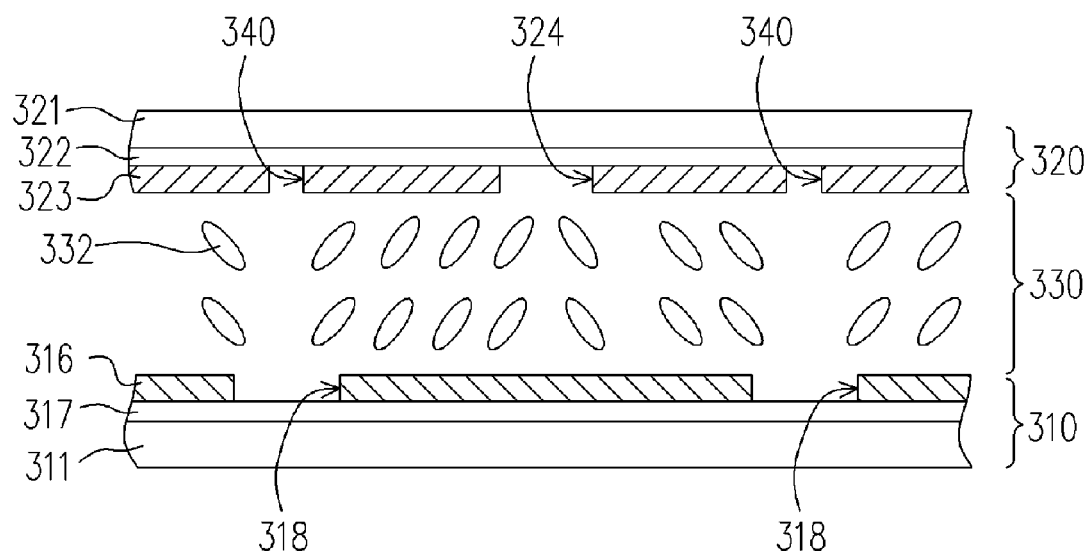
Figure 8C:
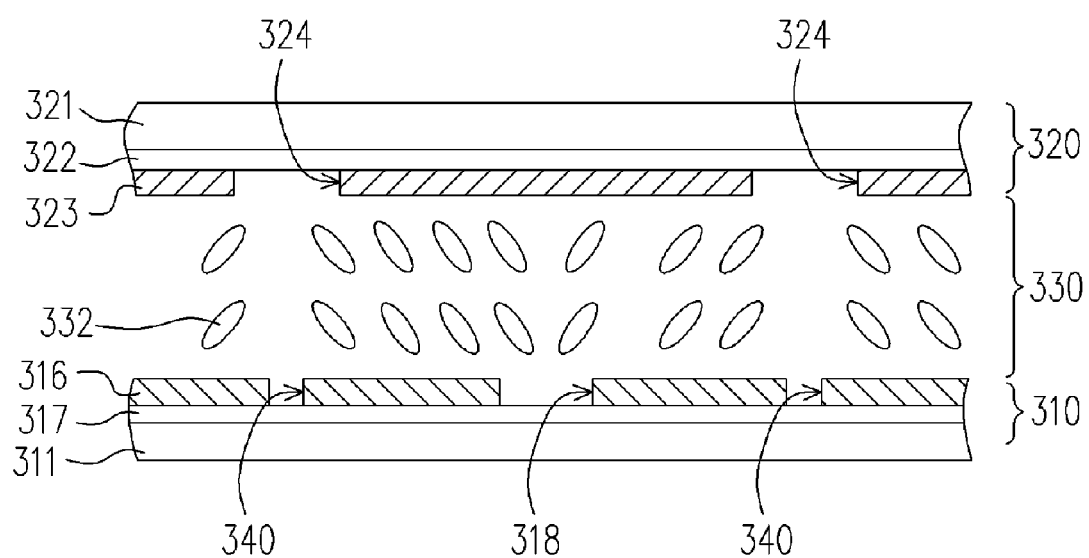

The MVA LCD panel with openings 340 comprises a first alignment pattern 318 disposed on a first substrate 310, and a second alignment pattern 324 disposed on a second substrate 320, wherein the first and second alignment patterns 318, 324 are matched with slits and protrusions as in FIG. 4A, FIG. 6A and FIG. 6B. FIG. 8A to FIG. 8C show cross-sectional views of three kinds of MVA LCD panels according to an embodiment of the present invention. First, referring to FIG. 8A, the MVA LCD has almost the same structure as FIG. 6A, so the similarities are not repeated here. Note that the openings 340 are formed in the electrode layer 323 on the opposite side of the first alignment pattern 318 (comprised of protrusions). Referring to FIG. 8B, the MVA LCD has almost the same structure as FIG. 6B. Note that the openings 340 are formed in the electrode layer 323 on the opposite side of the first alignment pattern 318. As shown in FIG. 8C, when the first and second alignment patterns 318, 324 comprise slits, openings 340 can also be disposed in the pixel electrode layer 316 on the opposite side of the second alignment pattern 324. Alternatively, openings 340 can be disposed in both the pixel electrode layer 316 and the electrode layer 323 (not shown) on the opposite sides of the first and second alignment pattern 318, 324.

In summary, when a driving voltage is applied between these two substrates 310 and 320 that utilize different match of slits and protrusions having shrinking areas 318a, 324a, as well as openings, electrical line distribution near slits and protrusions having shrinking areas 318a, 324a, as well as openings can make the liquid crystal molecules 332 to be tilted in the same direction and are thus quickly polarized to a stable state. Thus, the present invention has better display quality in dynamic pictures.

The present invention provides another pixel structure disposed on an active-device-array substrate (i.e. the first substrate 310), which comprises an active device 315, a pixel electrode layer 316 and a plurality of first alignment patterns 318, as shown in FIG. 4., FIG. 4A and FIG. 6A. The active device 315 disposed on the substrate 311 may be a thin film transistor. The pixel electrode layer 316 is disposed on the substrate 311 and electrically connected to the active device 315. A plurality of first alignment patterns 318 are disposed on the pixel electrode layer 316, wherein each first alignment pattern 318 has at least a shrinking area 318a and the width d1 of the shrinking area 318a is smaller than that d2 of the other area of the first alignment pattern 318. Likewise, the first alignment pattern 318 may be comprised of a plurality of slits formed in the pixel electrode layer 316. Alternatively, as shown in FIG. 6A, the first alignment pattern 318 may be comprised of a plurality of protrusions formed in the pixel electrode layer 316.

In addition, as shown in FIG. 7 and FIG. 7A, the pixel electrode layer 316 disposed between two neighboring slits may further comprise a plurality of openings 340. In one embodiment, the openings 340 are formed in the pixel electrode layer 316 on the opposite side of the second alignment pattern 324. In summary, the pixel structure disposed on the active-device-array substrate of the present invention comprises the first alignment pattern 318 disposed thereon, which may comprise slits, protrusions or openings 340 formed in the pixel electrode layer 316. The other similar structures are described in the preceding embodiment and the description is not repeated here.

The present invention provides another pixel structure disposed on a color filter substrate (i.e. the second substrate 320), which comprises a color photo-resist layer 322, an electrode layer 323 and a plurality of second alignment patterns 324, as shown in FIG. 5, FIG. 4A and FIG. 6A. The color photo-resist layer 322 is disposed on the substrate 321. The electrode layer 323 is disposed on the color photo-resist layer 322. The second alignment patterns 324 are disposed on the electrode layer 323, wherein each second alignment pattern 324 has at least a shrinking area 324a and the width of the shrinking area 324a is smaller than that of the other area of the second alignment pattern 324. Likewise, as shown in FIG. 4A, the second alignment pattern 324 may be comprised of a plurality of protrusions formed in the electrode layer 323. Furthermore, as shown in FIG. 6A, the second alignment pattern 324 may be comprised of a plurality of slits formed in the electrode layer 323.

Alternatively, as shown in FIG. 8A, the electrode layer 323 disposed between two neighboring slits may further comprise a plurality of openings 340. In one embodiment, the openings 340 are formed in the electrode layer 323 on the opposite side of the first alignment pattern 318.

In summary, the pixel structure disposed on the color filter substrate comprises the second alignment pattern 324 disposed thereon, which may comprise slits, protrusions or openings 340 formed in the electrode layer 323. The other similar structures are described in the preceding embodiment and the description is not repeated here.

Therefore, the MVA LCD panel, the pixel structure disposed on the active-device-array substrate and the pixel structure disposed on the color filter substrate have at least the following advantages.

(1) When a driving voltage is applied between these two substrates, since the present invention utilizes the alignment pattern with a shrinking area, electrical line distribution nearby can make the liquid crystal molecules to be tilted in the same direction and are thus quickly polarized to a stable state, thereby acquiring better dynamic pictures.

(2) The alignment pattern (slits or protrusions) and openings of the present invention can be fabricated on the pixel electrode of the active-device-array substrate, or on the electrode layer of the color substrate. A variety of MVA LCD panels can be fabricated by using different matches of slits or protrusions, such that the liquid crystal molecules can be quickly polarized to a stable state.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal panel, comprising:
a first substrate, comprising an active device array, a pixel electrode layer and a plurality of first alignment patterns, wherein each of the first alignment patterns has a plurality of first shrinking areas separated from each other, the first shrinking areas within each of the first alignment patterns are separated by a fixed distance, the width of the plurality of first shrinking areas within each of the first alignment patterns is fixed and smaller than that of the other areas of the first alignment pattern, the length of each of the first shrinking areas is smaller than the fixed distance between two adjacent shrinking areas of the first shrinking areas, each of the first alignment patterns is comprised of a plurality of slits formed in the pixel electrode layer, wherein the pixel electrode layer disposed between two neighboring slits having the plurality of first shrinking areas, the pixel electrode layer further comprises a plurality of openings, and the plurality of openings is arranged along a direction parallel to an extending direction of one of the slits;
a second substrate disposed above the first substrate, comprising an electrode layer and a plurality of second alignment patterns thereon, wherein the second alignment patterns and the first alignment patterns are staggered, a projection area of the plurality of second alignment patterns on the first substrate is overlapping with a projection area of the plurality of openings; and
a liquid crystal layer, disposed between the first substrate and the second substrate.

2. The liquid crystal panel according to claim 1, wherein the second alignment pattern is comprised of a plurality of protrusions formed in the electrode layer.

3. The liquid crystal panel according to claim 1, wherein the active device array comprises:
a plurality of signal lines and a plurality of scan lines to define a plurality of pixel areas; and
a plurality of thin film transistors, respectively disposed in the plurality of pixel areas and electrically connected to the plurality of signal lines and scan lines.

4. The liquid crystal panel according to claim 1, wherein the second substrate further comprises a color photo-resist layer.

5. A pixel structure, comprising:
an active element, disposed on a substrate;
a pixel electrode layer, disposed on the substrate and electrically connected to the active element; and
a plurality of alignment patterns, disposed on the pixel electrode layer, wherein each of the alignment patterns has a plurality of shrinking areas separated from each other, the shrinking areas within each of the first alignment patterns are separated by a fixed distance, the width of the plurality of shrinking areas within each of the alignment patterns is fixed and smaller than that of the other areas of each of the alignment patterns, the length of each of the shrinking areas is smaller than the fixed distance between two adjacent shrinking areas of the shrinking areas, the alignment patterns are comprised of a plurality of slits formed in the pixel electrode layer, wherein the pixel electrode layer disposed between two neighboring slits having the plurality of shrinking areas, the pixel electrode layer further comprises a plurality of openings, and the plurality of openings is arranged along a direction parallel to an extending direction of one of the slits.

6. A liquid crystal panel, comprising:

a first substrate, comprising an active device array, a pixel electrode layer and a plurality of slits formed in the pixel electrode layer, wherein each of the slits has a plurality of first shrinking areas separated from each other, the first shrinking areas within each of the first alignment patterns are separated by a fixed distance, the width of the first shrinking areas within each of the slits is fixed and smaller than that of the other areas of the slit, the length of each of the first shrinking areas is smaller than the fixed distance between two adjacent shrinking areas of the first shrinking areas, the pixel electrode layer disposed between two neighboring slits having the plurality of first shrinking areas, the pixel electrode layer further comprises a plurality of openings, and the plurality of openings disposed between two neighboring slits is arranged along a direction parallel to an extending direction of the two neighboring slits;

a second substrate disposed above the first substrate, comprising an electrode layer and a plurality of protrusions formed on the electrode layer, wherein the protrusions are alignment patterns, the protrusions and the slits are staggered, and a projection area of the protrusions on the first substrate is overlapping with a projection area of the plurality of openings; and a liquid crystal layer, disposed between the first substrate and the second substrate.

* * * * *